United States Patent

[11] 3,628,673

[72] Inventor Charles L. Lynn, Jr.
Lafayette, Ind.
[21] Appl. No. 838,570
[22] Filed July 2, 1969
[45] Patented Dec. 21, 1971
[73] Assignees Lynn Airco, Inc.;
Louis Pearlman, Jr.
Lafayette, Ind., part interest to each

[54] CARGO-HANDLING SYSTEM
1 Claim, 9 Drawing Figs.

[52] U.S. Cl. .................................. 214/1 BE,
302/29
[51] Int. Cl. ..................................... B60v 1/04
[50] Field of Search ........................... 214/1, 1
AB; 302/99, 31

[56] References Cited
UNITED STATES PATENTS
3,055,446   9/1962   Vaughen ..................... 180/125
3,081,886   3/1963   Flexman et al. ............ 214/1 AB
3,452,883   7/1969   Watters ...................... 214/1 AB
2,176,307  10/1939   Lamb et al. ................. 214/1 AB X
2,785,928   3/1957   Hanson ....................... 302/29 X
2,944,684   7/1960   Dennis ........................ 214/1 AB
2,975,701   3/1961   Munschauer Jr. et al..... 214/1 AB UX
3,204,715   9/1965   Maloof ........................ 214/1 AB X FOREIGN PATENTS
694,796   9/1964   Canada ........................ 214/1 AB Primary Examiner—Gerald M. Forlenza
Assistant Examiner—Frank E. Werner
Attorney—Woodard, Weikart, Emhardt & Naughton ABSTRACT: A cargo-handling system wherein cargo is supported on a plurality of low-pressure airstreams which originate from a floor section having a plurality of apertures therein. The positioning of the cargo controls the flow of air through said apertures by the opening and closing of valve means. Compressed air is supplied from a plurality of plenums which are an integral part of the floor section. The preferred valve means are balls which are positioned in pockets below the floor apertures. The cargo-handling system is particularly suited for use in conjunction with aircraft.

PATENTED DEC 21 1971 3,628,673

INVENTOR
CHARLES L. LYNN JR.
BY
Woodard, Weikart, Emhardt & Naughton
ATTORNEYS

CARGO-HANDLING SYSTEM

BACKGROUND OF THE INVENTION

1. Field of the Invention

This invention is concerned with a cargo-handling system wherein cargo is supported on a plurality of low-pressure airstreams, which originate from a floor section. The flow of the airstreams is controlled by the positioning of the cargo.

2. Description of the Invention

Cargo-handling systems are generally known in the prior art. In their most common form, these systems consist of a large number of rollers or balls which are journaled in elongated sections. The mounting is such that these rollers or balls have low resistance to rotation in place. The sections are usually placed end to end in such a fashion that cargo can be conveniently moved from one area to another area. Because the rollers are journaled in such a manner that they have a low-friction cargo-supporting surface, a small thrust applied to the cargo is usually capable of moving it a considerable distance. While WHile the above-described systems are generally satisfactory, they are disadvantageous in that they are expensive to manufacture and they are very heavy.

These systems are expensive and heavy in that they utilize a large number of precision rollers or balls, which are formed from metal or high-density plastics. Likewise in order to achieve the desired low friction, these components must be journaled in precision bearings, such as ball or needle bearings.

Because the prior art systems are expensive, their usage is often limited. Due to their weight, they were often not suited for use in weight critical environments such as in aircraft. In contrast, this invention is concerned with a lightweight cargo-handling system which can be cheaply manufactured and which is readily suited for use in aircraft.

SUMMARY OF THE INVENTION

This invention is concerned with a cargo-handling system wherein cargo is supported on a plurality of streams or blanket or cushion of low-pressure air. The system generally comprises a floor section which has a plurality of apertures therein. Compressed air is allowed to escape from these apertures in such a fashion that cargo is bouyed on a cushion of air. The flow of compressed air is controlled by valve means associated with the apertures. These valve means are activated by the placement of cargo over the apertures. The preferred valve mean consist of balls which are positioned in pockets below the apertures. The floor section can be an integral part of a plenum through which air is supplied to a large number of apertures.

DESCRIPTION OF THE PREFERRED EMBODIMENT

Figure 1:
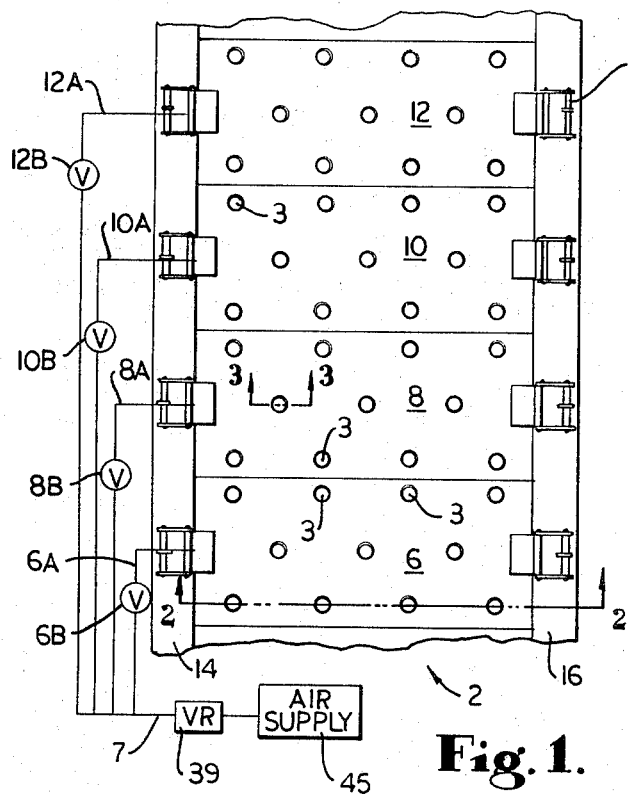
FIG. 1 is a partial top plan view of a typical embodiment of the cargo-handling system of the invention.
Figure 2:
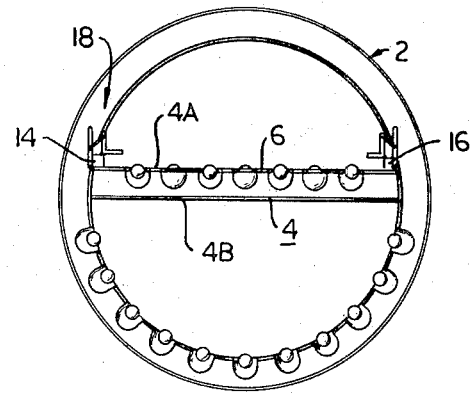
FIG. 2 is a cross section of an aircraft fuselage at line 2—2 in FIG. 1 with the cargo-handling system of this invention installed therein.

REferring to FIGS. 1 and 2, it can be seen that the cargo-handling system 2 of this invention consists of a plurality of plenum sections 6, 8, 10 and 12, which incorporate top surfaces having a large number of apertures 5 in which are positioned valving means in the form of balls 3. The plenum sections have a hollow cross section and are formed by upper and lower plate sections 4A and 4B, the former serving as the floor of the cargo compartment. Compressed air is supplied to the plenum sections through air lines 6A, 8A, 10A, and 12A which are connected to central line 7. The flow of air through these lines is controlled by valves 6B, 8B, 10B, and 12B. Using these air lines and control valves, it is possible to control the flow of compressed air to individual plenum sections in such a manner that air is supplied only when needed to facilitate movement of cargo along the floor.

Figures 3, 4, 5:
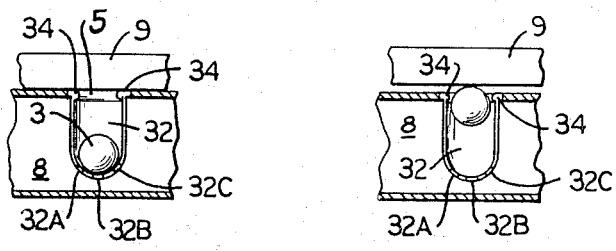
FIG. 3 is an enlarged section of the valve means used in this embodiment, in an air-off stance, the section being taken at line 3—3 in FIG. 1.
FIG. 4 is a section similar to FIG. 3 in an air-on with a load-applied stance.
FIG. 5 is a section similar to FIG. 3 in an air-on with a no-load stance.

Referring to FIG. 3 showing details of the floor-located valving means, it can be seen that a ball 3 is positioned in a pocket 32 which has a U-shaped cross section. The upper edge of the pocket incorporates an annular seal 34 which defines aperture 5. This seal is formed from a resilient plastic material. The diameter of the ball 3 is slightly greater than the diameter of the aperture so the ball can project only partially through the aperture. For example, the ball can be 5 inches in diameter while the aperture formed by the seal is 4.75 inches in diameter. This allows the ball to protrude above the floor top surface about 1.75 inches.

The lower extremity of pocket 32 incorporates a plurality of ports 32A, 32B and 32C, the axes of which are generally parallel with the axis of pocket 32. The absence or presence of flow of air through these ports generally controls the position of the ball in the pocket.

FIG. 3 illustrates the location of the ball in the pocket when no air is being supplied to plenum 6. It can be seen that when the air is off, the ball is positioned on the bottom of pocket 32. Likewise, it should be noted that when the air is off, cargo pallet 9 is flush against the upper plate 4A of the plenum, this plate serving as a floor of the cargo compartment.

In FIG. 5, the ball is illustrated in an air-on position. Here it can be seen that with air turned on by opening valve 6B (FIG. 1), the ball is pushed upwardly until it is biased against seal 34 and thereby prevents the further escape of air. However, this full-shut condition can only occur in the absence of the pallet.

In FIG. 4, the ball is illustrated in an air-on position with a load applied. It can be seen that when pallet 9 is positioned over aperture 5, the ball is moved downwardly somewhat into pocket 32. Air escaping around the ball supports pallet 9.

It is preferred that the balls for use in this invention be formed hollow from a plastic material such as a Teflon polymer or nylon, for example. While a ball is specifically illustrated for use in pocket 32, it is understood that other shapes might be employed.

The air pressure supplied to the plenum may be adjusted by an adjustable regulator, 39, on the main line 7 from the air source 45 or by individual regulators, associated with the valves 6B, 8B, 10B and 12B. The pressure used may be dependent on many variables including the pallet size, pallet load and number of apertures. In normal operations, air pressure which slightly exceeds atmospheric pressure is sufficient for operation. For example, air pressure in the range of 16 to 20 pounds per square inch absolute (1 to 5 p.s.i. gauge) is suited for use in this invention. This air can be supplied from any convenient source. For example, in aircraft usage this air can be supplied from the same source as used for air conditioning and pressurization. Likewise, this air can be supplied by bleed lines from a turbine engine.

In use of the apparatus, cargo pallets may be resealing from a warehouse or storage area incorporating the same type of floor structure as described above, along conveyor ramps of the same type construction, into the aircraft, by simply pushing or pulling the pallets or by appropriate inclination of surfaces. As the pallets move, they encounter and depress the seal balls in their path, thus advancing the cushion of air furnished by the unsealed balls. As rear edges of pallets disengage seal balls, those balls rise and reseal their respective apertures. Accordingly, a continuous cushion of air is provided and advanced at the rate of movement of the pallet. The resealing of the balls conserves air.

Upon arrival of pallets at the desired location in the aircraft, the appropriate plenum section supply valve 6A or the like can be closed, whereupon the pallet or pallets on the plenum section supplied thereby, settle onto the floor, as in FIG. 3. They can then be clamped in place.

In the illustrated embodiment of this invention a pair of opposing guide rails 14 and 16 fixed in the aircraft, have a plurality of locking clamps 18 thereon. It is preferred that at least two pairs of opposing clamps be used per plenum section, in order that cargo pallets might be securely fastened down on the floor between the guide rails 14 and 16.

Figures 6, 7, 8:
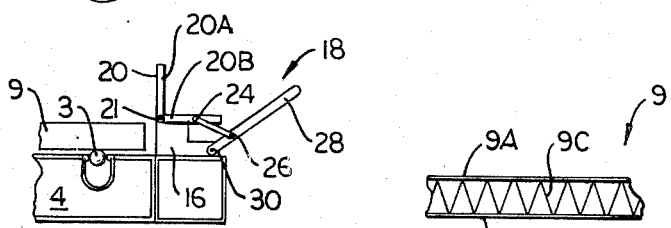
FIG. 6 is a side view, partially in section, illustrating a clamp which can be used in this invention, in a locked position.
FIG. 7 is a view similar to FIG. 6 but showing the clamp in an unlocked position.
FIG. 8 is a fragmentary cross section of a pallet for use in this invention.

FIGS. 6 and 7 illustrate in detail clamp 18 which can be used in accordance with this invention. This clamp includes an elongated L-shaped bracket 20 formed of legs 20A and 20B. This bracket is adapted to pivot around axis 21. Pivotally attached to leg 20B at point 24 is arm 23. This arm is further pivotally attached to handle 28 at point 26. The handle is further pivotally attached to a base of guide rail 16 at point 30. When the handle is pushed toward the guide rail (FIG. 6), leg 20A of the L-shaped bracket is securely biased against pallet 9. In turn, pallet 9 is securely biased against the floor section in such a fashion that it cannot shift or move. In contrast, when the handle is pulled away from the guide rail, (FIG. 7), leg 20A is disposed vertically and the pallet is free to move parallel to the guide rails. Other types of clamps can also be used in implementing this invention.

Pallets for use in this invention can be of any convenient size or shape. A rectangular pallet 88 inches wide and 125 inches long is one example. In accordance with one aspect of this invention as is shown in FIG. 8, the pallet can be formed from a pair of upper and lower metal plates 9A and 9B which are bonded to a honeycomb sheet 9C which may be formed from, for example, aluminum or kraft paper.

Figure 9:
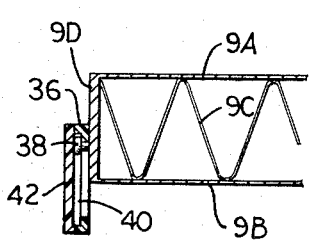
FIG. 9 is a fragmentary section of still another pallet for use in this invention.

FIG. 9 illustrates still another pallet structure which can be used in accordance with this invention. This pallet is formed from pair of upper and lower plates 9A and 9B and an inner honeycomb structure 9C as described above. This structure further has side plates 9D attached to the sides thereof. Positioned adjacent to sideplates 9D are skirts 36 which have vertically elongated slots 40 formed therein. The skirts are attached to the sideplates around the perimeter of the pallet by means of pins 38 which pass through slots 40. Due to the elongated nature of the slots, the pallet is adapted to ride up and down in relation to the skirt. Slot 40 is further made airtight by closing strip 42. The arrangement is advantageous in that the skirt prevents the escape of supporting air around the sides of the pallet. This arrangement is particularly suited for use with uneven loads wherein the sides of the pallet may be uneven. When this occurs, the skirts adjust so as to compensate for the uneven loading and thereby prevent the loss of air. The skirts are preferably formed from a low-friction material such as a Teflon type polymer.

The expression pallet, as used herein, in addition to including the structure described specifically hereinabove, may include a variety of cargo support means such as boxes, smooth bottom crates, and tanks, for example.

It can be seen in FIG. 2 that the cargo-handling system of this invention can be utilized in floor section 4, but also on nonplanar surfaces as in the lower portion of the fuselage also. In this manner, maximum use of the available cargo area can be made, and an appropriate pallet shape can be employed accordingly.

What is claimed is:

1. A cargo-handling system comprising, a floor section having a plurality of apertures therein, a compressed air system which is adapted to supply compressed air to said apertures, and a plurality of valve means positioned in the vicinity of said apertures, wherein said valve means are adapted to control the flow of compressed air through said apertures, said valve means comprises balls which are positioned in relationship to said apertures and which have a diameter which is slightly greater than the diameter of said apertures, said balls are positioned in pockets, the upper edges of said pockets incorporate annular seals, against which said balls are adapted to be biased, said pockets are disposed in said chambers and the lower extremities of said pockets contain a plurality of ports through which compressed air enters said pockets from said chambers, said pockets have a U-shaped cross section, said ports are directed towards said apertures, a pallet is receive on said balls and depresses said balls in said apertures to unseal said apertures, clamping means are provided for securing a pallet, and said pallet has a movable skirt around its periphery controlling the escape of air thereunder.

* * * * *